United States Patent
Nurse, Jr.

[19]

[11] Patent Number: 6,047,724
[45] Date of Patent: Apr. 11, 2000

[54] RISERS FOR A WASTE WATER TREATMENT FACILITY

[76] Inventor: Harry L. Nurse, Jr., 10409 Watterson Trail, Louisville, Ky. 40299

[21] Appl. No.: 09/022,176

[22] Filed: Feb. 11, 1998

[51] Int. Cl.[7] .................................................. F16L 5/00
[52] U.S. Cl. .................. 137/363; 137/236.1; 405/53; 52/20
[58] Field of Search .................. 137/363, 364, 137/371, 236.1; 405/53; 52/20

[56] References Cited

U.S. PATENT DOCUMENTS

| | | |
|---|---|---|
| 616,542 | 12/1898 | Koehne . |
| 1,966,244 | 7/1934 | Hansen ...................................... 405/53 |
| 2,764,545 | 9/1956 | Primich . |
| 3,390,224 | 6/1968 | Wyatt . |
| 3,913,953 | 10/1975 | Archer et al. . |
| 4,303,350 | 12/1981 | Dix . |
| 4,874,105 | 10/1989 | Tetreàult . |
| 4,959,506 | 9/1990 | Petty et al. . |
| 5,186,821 | 2/1993 | Murphy . |
| 5,297,895 | 3/1994 | Johnson . |
| 5,366,318 | 11/1994 | Brancher . |
| 5,542,780 | 8/1996 | Kourgli ...................................... 405/53 |
| 5,934,315 | 8/1999 | Braswell et al. ........................... 137/364 |

FOREIGN PATENT DOCUMENTS

| | | | |
|---|---|---|---|
| 2150953 | 7/1985 | United Kingdom .................... | 137/363 |

*Primary Examiner*—A. Michael Chambers
*Attorney, Agent, or Firm*—Charles G. Lamb; Middleton & Reulinger

[57] ABSTRACT

A riser for use with an access opening in a waste water treatment tank is mounted in a top opening in the waste water treatment tank. The riser includes a top portion and an integral bottom portion wherein the top portion is provided with a downwardly extending side wall and the bottom portion is provided with a downwardly extending skirt. The bottom portion is provided with an inner diameter greater than the outer diameter of the top portion and a ring connects the bottom portion to the top portion. The bottom portion is also provided with an inwardly extending flange having an inner terminating end engagable with the outer surface of the top portion. The top portion is provided with lugs at circumferentially spaced positions for engaging relation with slots in the flange portion for connecting adjacent risers in tandem. A plurality of risers may be connected to each other and in turn, the bottommost riser is connectable to the access opening and the uppermost riser is connectable to a cover usually at ground surface.

18 Claims, 5 Drawing Sheets

RISERS FOR A WASTE WATER TREATMENT FACILITY

BACKGROUND OF THE INVENTION

This invention relates to risers for waste water treatment facilities and more particularly relates to risers for use with access openings in septic tanks.

In water treatment facilities and particularly sewage treatment or septic tanks, it is common practice to manufacture tanks with top opening entrances which are used for access to the tanks for cleaning, by pumping out the insides, or repairing, or replacing filter elements or the like therein. Moreover, there is no standard dimensions for a septic tank nor are there standard distances from the ground surface to the top of the tank when the tank is installed in the ground. Thus, manufacturers and users of septic tanks are presented with a problem of providing access means to the septic tank.

SUMMARY OF THE INVENTION

It is an object of the present invention to provide a riser between a top access opening in a waste water treatment tank and ground surface when the tank top is disposed below the ground surface.

It is another object of the present invention to provide interconnecting risers to add additional height to a top entering access opening in a septic tank and the ground surface thereabove.

Even more particularly, the present invention provides a riser for a housing, such as a septic tank, comprising: a top portion and an integral bottom portion; a longitudinally extending opening therethrough; the top portion having a downwardly extending side wall, the side wall having an outer surface with engagement means thereon for engaging in tandem adjacent risers; a radially extending ring connecting the top portion and the bottom portion, the bottom portion having a diameter greater than the top portion; and, the bottom portion having a downwardly extending skirt portion with means for engagement with the outer surface of the top portion side wall of an adjacent riser.

BRIEF DESCRIPTION OF THE DRAWINGS

A better understanding of the invention will be had upon reference to the following description in conjunction with the accompanying drawings in which like numerals refer to like parts throughout the several views and wherein.

DETAILED DESCRIPTION OF THE PREFERRED EMBODIMENTS

Figure 1:
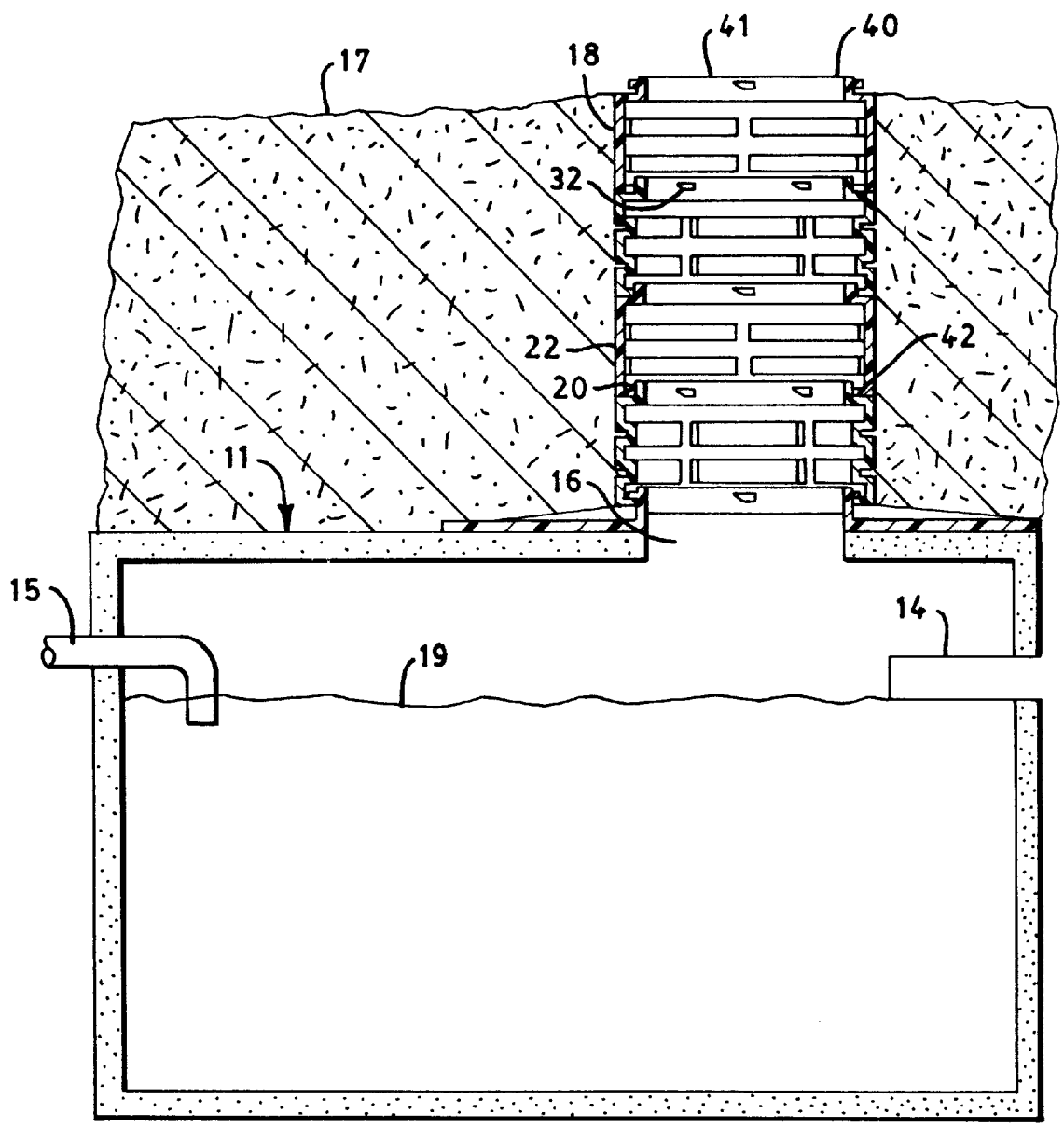
FIG. 1 is a cross-sectional elevational view of an example of a device within the scope of the present invention in a septic tank in a sewage treatment application.

With reference to FIG. 1, there is shown a septic tank 11 in a sewage treatment application. Liquid to be treated is admitted into the tank 11 through an inlet 15. A level 19 of the liquid is maintained in the tank 11 and the liquid to be treated enters through inlet 15 and exits through discharge line 14. The liquid in tank 11 may be subjected to many different types of treatment, such as, bacterial degradation processes, filtration and the like. As shown, the tank 11 is provided with a plurality of risers 18 which extend upward from a service access entrance 16 to the ground surface 17. A cover 40 is attached to the topmost riser 18, cover 40 being approximately flush with the ground surface 17. The bottommost riser 18 may be cast in place, or retrofitted to service access entrances 16 of existing tanks.

Figure 2:
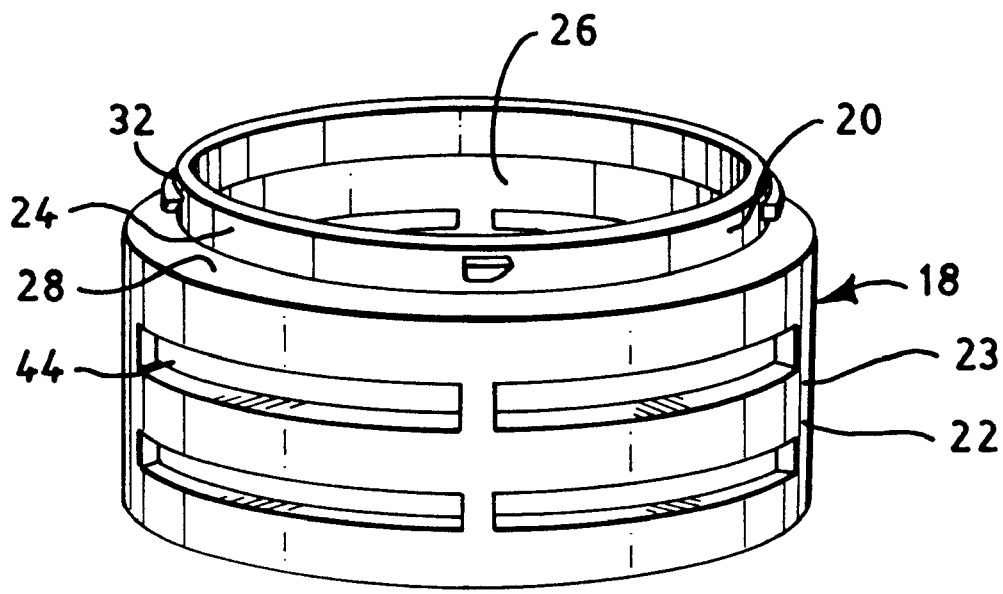
FIG. 2 is a perspective view of one riser shown in FIG. 1.
Figure 3:
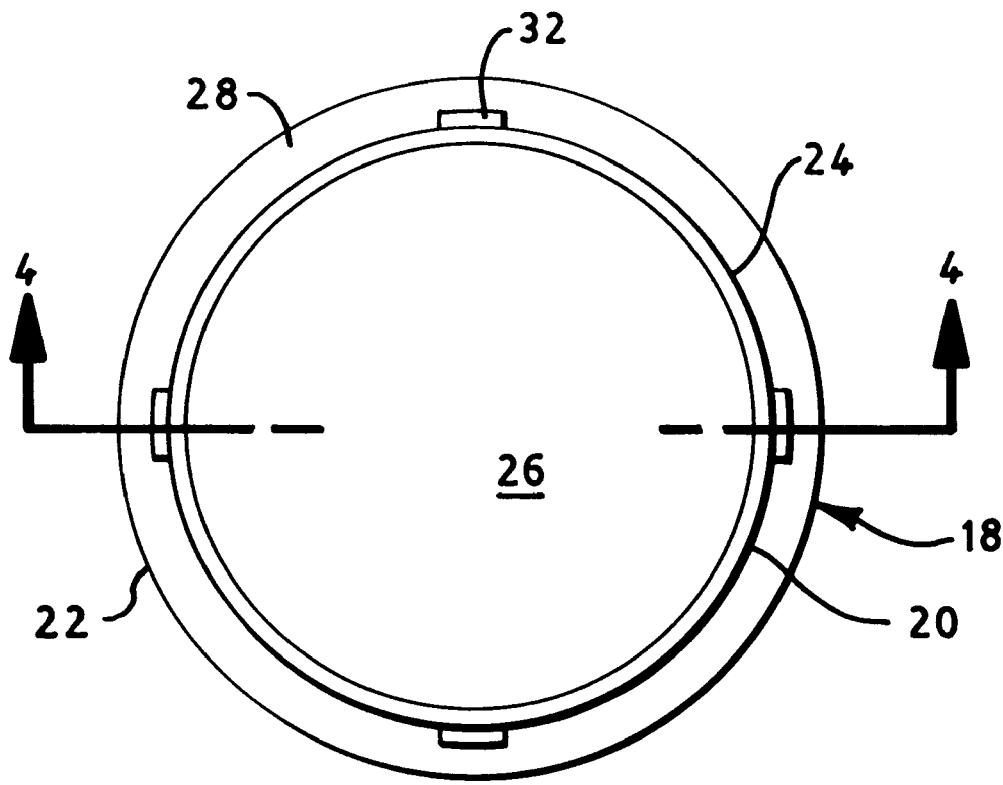
FIG. 3 is a top view of the riser of FIG. 2.
Figure 4:
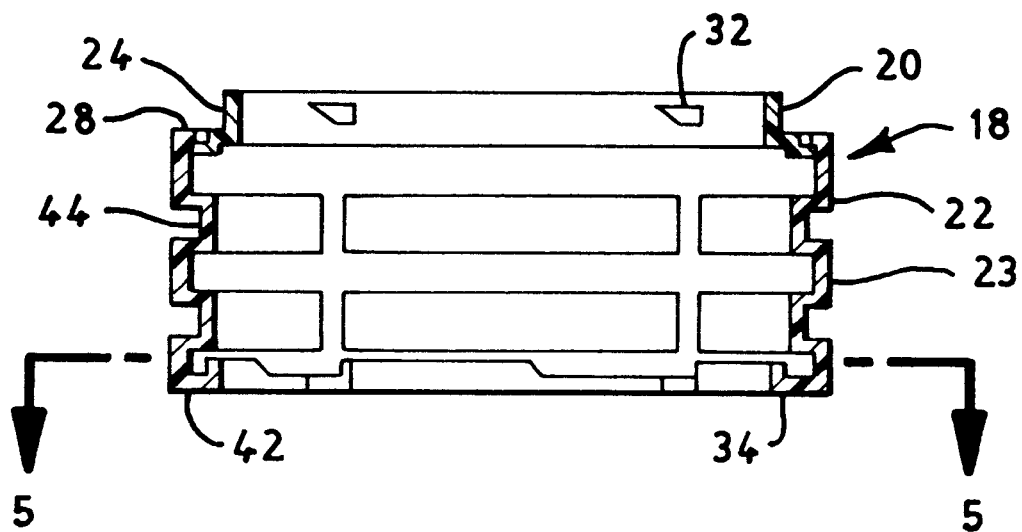
FIG. 4 is a cross-sectional view of the riser of FIG. 2 taken through a plane passing through line 4—4 of FIG. 3.

Referring now to FIGS. 2–4, the risers 18 are provided with a top portion 20 and integral therewith a bottom portion 22 with a longitudinally extending opening 26 therethrough. The top portion 20 includes a downwardly extending side wall 24 with a plurality of first engaging means, shown as lugs 32, mounted circumferentially of the side wall 24 and spaced at preselected positions above a ring 28 which connects the top portion 20 to the bottom portion 22. As shown, the outer diameter of the top portion 24 is less than the inner diameter of the bottom portion 22. The bottom 22 is provided with a downwardly extending skirt portion 23 terminating with an inwardly extending flange portion 42. Flange portion 42 at its innermost extremity is provided with an upwardly extending lip 34. The inner diameter or innermost extremity of the flange 42 is substantially equal to the outer diameter of the side wall 24 wherein, as shown in FIG. 1, the bottom portion 22 receives in mating relation a top portion 20 of an adjacent riser 18 when mounted in tandem.

Figure 5:
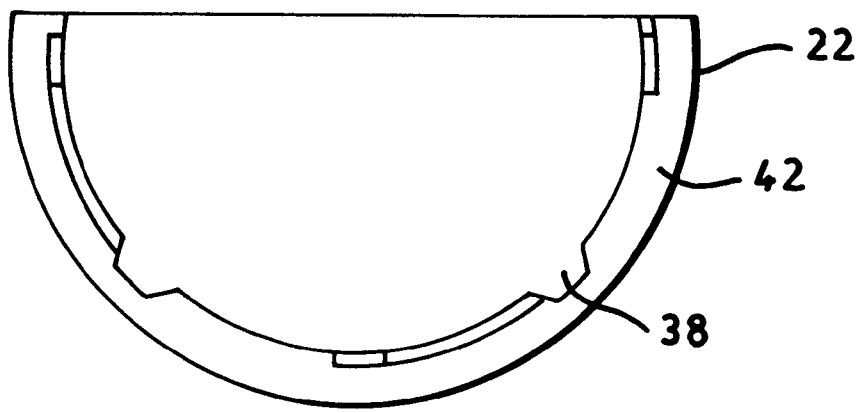
FIG. 5 is a cross-sectional view of the risers of FIG. 2 taken through a plane passing through line 5—5 of FIG. 4.
Figure 6:
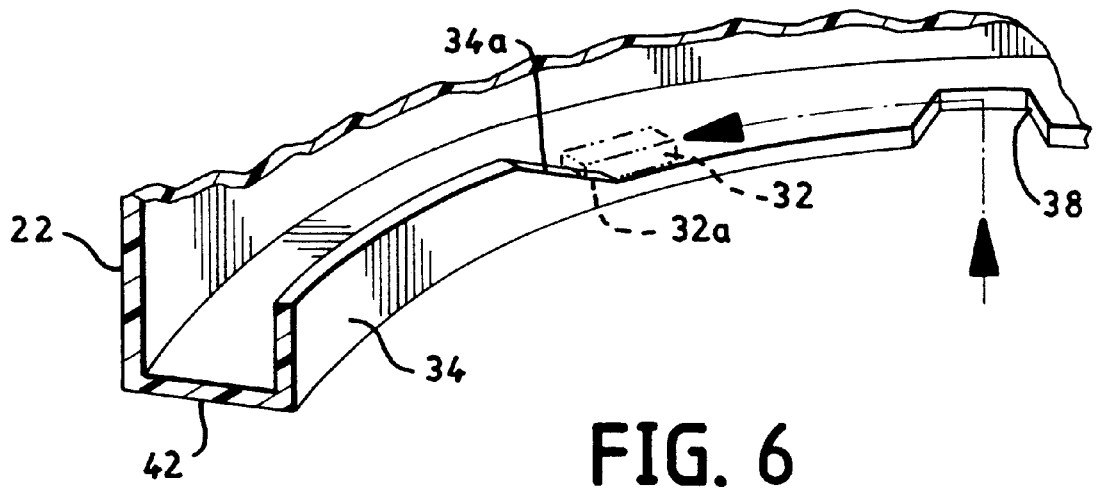
FIG. 6 is an enlarged sectional view, in perspective, showing the connection between adjacent risers of FIG. 1.

As best shown in FIGS. 5 and 6, the flange 42 is provided with a plurality of second engaging means, shown as slots 38, which are sized and spaced at preselected positions therearound. The slots 38 are disposed to receive lugs 32 of adjacent risers for connecting the risers 18 in tandem. As best shown in FIG. 6, a plurality of lips 34 extend around selected portions of flange 42, each lip 34 terminating with an inclined stop portion 34a which is at a preselected distance from a slot 38. Lugs 32 are provided with sloped edges 32a, as shown with phantom lines, which are mateable with inclined stop portions 34a. In interconnecting relation between adjacent risers 18, slots 38 receive the lugs 32 therein and upon turning the risers in relation to each other or the filter housing, the sloped edges 32a of lugs 32 engage with and are stopped by mating inclined stop portions 34a thereby preventing turning of connected risers 18 when in a use condition.

Referring back to FIG. 2, a plurality of grooves 44 are provided in the outer surface of bottom portion 22. In an installation, risers 18 are surrounded by dirt and additional dirt filled into grooves 44 assist in the prevention of the risers 18 turning after installation.

In the building of septic tanks there is not a set standard for defining the distance between a top of a septic tank and the ground surface 17, nor is there a particular size or configuration for an access opening in the top. Thus, the access opening must either have a riser cast in place or be retro-fitted to receive a top portion of a riser of the present invention. Moreover, the risers may be made in varying heights, such as 2", 4", 6", thereby enabling installers flexibility in working with septic tank access openings in septic tanks 11 of varying depths in the ground. Furthermore, the cover 40 has a top portion and a bottom portion the same as the risers, the only difference being that instead of an opening 26, the cover 40 includes a disc portion 41 which covers opening 26.

Figure 7:
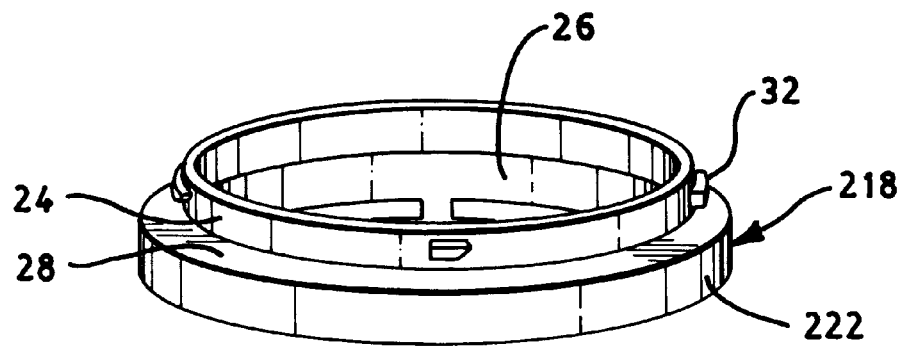
FIG. 7 is a perspective view of another riser of the present invention.

In FIG. 7 is shown another riser 218 of the present invention. The only difference between riser 218 and riser 18 is in the bottom portion. In FIG. 7, bottom portion 222 does not include dirt receiving grooves therearound and may be of a height different than bottom portion 22. Moreover, in this embodiment bottom 222 is substantially the same height as the top portion 24.

Figure 8:
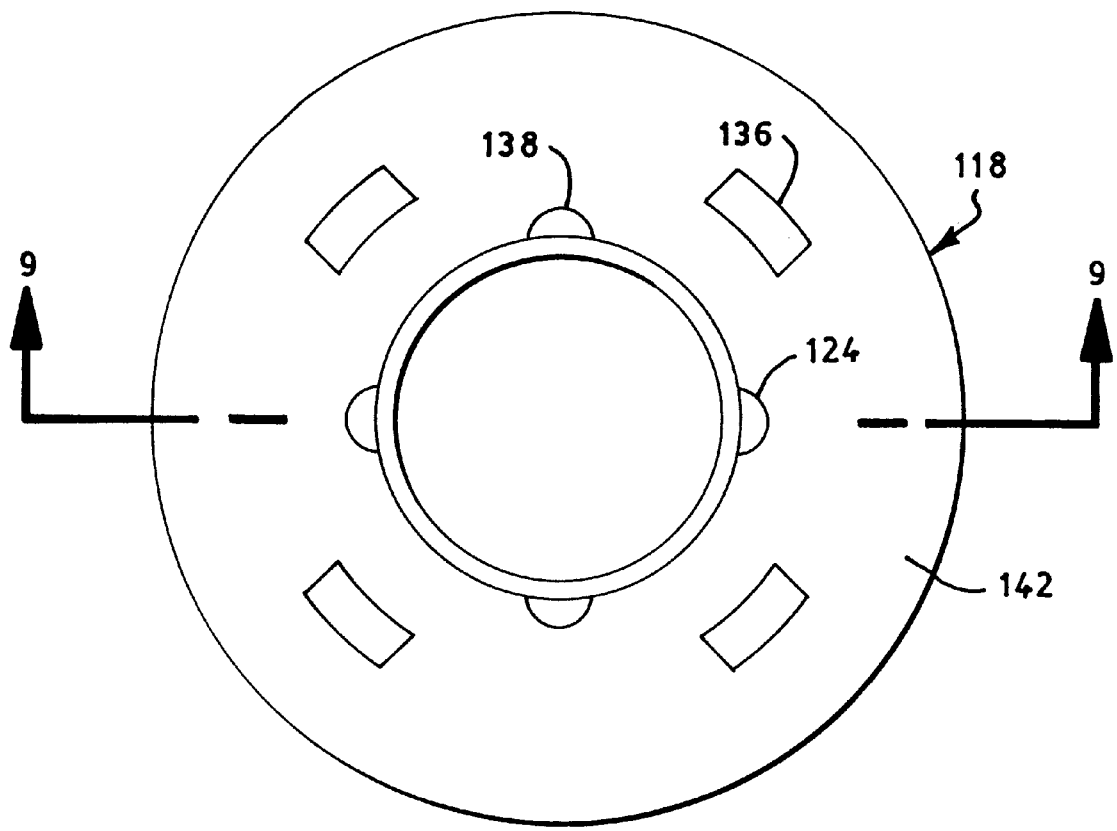
FIG. 8 is a bottom view of the riser of FIG. 7.
Figure 9:
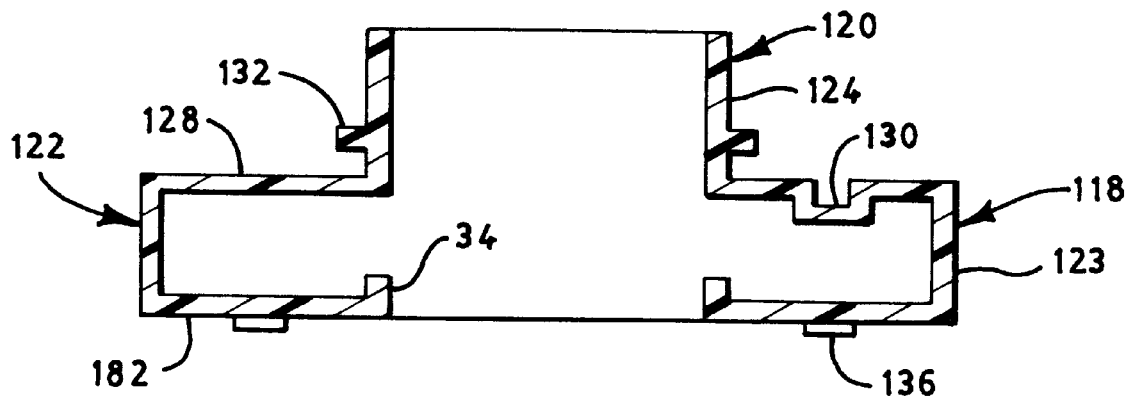
FIG. 9 is a cross-sectional view of the riser of FIG. 7 taken through a plane passing through lines 9—9 of FIG. 8.

Referring now to FIGS. 8–9, another riser 118 of the present invention is shown. The riser 118 is provided with a top portion 120 and integral therewith a bottom portion 122 with a longitudinally extending opening 126 therethrough. The top portion 120 includes a downwardly extending side wall 124 with a plurality of lugs 132 mounted circumferentially of the side wall 124 and spaced at preselected positions above a ring 128 which connects the top portion 120 to the bottom portion 122. As shown, the outer diameter of the top portion 124 is less than the inner diameter of the bottom portion 122. The bottom 122 is provided with an inwardly extending flange portion 142 which terminates with an upwardly extending lip 134. The inner diameter of the flange 142 is substantially equal to the outer diameter of the side wall 124 wherein, in the same manner as shown in FIG. 1 for riser 18, the bottom portion 122 receives in mating relation the top portion 120 of an adjacent riser 118 when mounted in tandem.

As best shown in FIG. 8, the flange 142 is provided with a plurality of slots 138 which are sized and spaced at preselected positions therearound. The slots 138 are disposed to receive lugs 132 of adjacent risers 118 for connecting the risers 118 in tandem. As shown in FIG. 8, ring 128 is also provided with a plurality of grooves 130 spaced therearound to receive tongues 136 which protrude downwardly from the flange 142 at preselected positions. In interconnecting relation between adjacent risers 118, slots 138 receive the lugs 132 therein and upon turning the risers 118 in relation to each other, the tongues 136 engage with and seat within the grooves 130 thereby preventing turning of connected risers 118 when in a use condition.

The foregoing detailed description is given primarily for clearness of understanding and no unnecessary limitations are to be understood therefrom for modifications will become obvious to those skilled in the art upon reading this disclosure and may be made without departing from the spirit of the invention and scope of the appended claims.

What is claimed is:

1. A riser for a tank comprising:

a top portion and an integral bottom portion with a longitudinally extending opening therethrough;

said top portion having a downwardly extending side wall, said side wall having an outer surface with first engaging means thereon;

a ring connecting said top portion to said bottom portion, said bottom portion having a diameter greater than said top portion; and, said bottom portion having a downwardly extending skirt portion with an inwardly extending flange having second engaging means engagable with first engaging means of another riser.

2. The riser of claim 1 including locking means for locking adjacent risers in non-rotatable relation.

3. The riser of claim 2, said locking means including a tongue on either an upper surface of said ring or a lower surface of said flange and a mating groove on the other of said ring or said flange.

4. The riser of claim 2, said locking means including an inclined stop portion in a lip circumferentially extending around the interior terminating edge of said flange, said stop portion being at a preselected distance from a slot in said flange, said slot being sized to receive said first engaging means therein, said stop portion engageable with said first engaging means.

5. The riser of claim 4, said first engaging means being a lug.

6. The riser of claim 1, said first engaging means including a plurality of outwardly protruding lugs at preselected spacing on said outer surface of said side wall and said second engaging means being a plurality of slots in said flange in mating relation with said plurality of lugs.

7. The riser of claim 1, said flange having an inner edge with a diameter equal to or greater than the outer diameter of said top portion.

8. The riser of claim 7, said flange having an upwardly projecting lip at its terminating inner edge engaging with an outer surface of a top portion of an adjacent riser.

9. The riser of claim 1, said skirt and said side wall being of substantially the same height.

10. A riser for a waste water treatment tank having a top access opening, the riser comprising:

a top portion and an integral bottom portion with a longitudinally extending opening therethrough;

said top portion having a downwardly extending side wall, said side wall having an outer surface with first engaging means thereon;

a ring connecting said top portion to said bottom portion, said bottom portion having a diameter greater than said top portion; and, said bottom portion having a downwardly extending skirt portion with an inwardly extending flange having second engaging means engageable with first engaging means of another riser.

11. The riser of claim 10 including locking means for locking adjacent risers in non-rotatable relation.

12. The riser of claim 11, said locking means including a tongue on either an upper surface of said ring or a lower surface of said flange and a mating groove on the other of said ring or said flange.

13. The riser of claim 11, said locking means including an inclined stop portion in a lip circumferentially extending around the interior terminating edge of said flange, said stop portion being at a preselected distance from a slot in said flange, said slot being sized to receive said first engaging means therein, said stop portion engageable with said first engaging means.

14. The riser of claim 13, said first engaging means being a lug.

15. The riser of claim 10, said first engaging means including a plurality of outwardly protruding lugs at preselected spacing on said outer surface of said side wall and said second engaging means being a plurality of slots in said flange in mating relation with said plurality of lugs.

16. The riser of claim 10, said flange having an inner edge with a diameter equal to or greater than the outer diameter of said top portion.

17. The riser of claim 16, said flange having an upwardly projecting lip at its terminating inner edge engaging with an outer surface of a top portion of an adjacent riser.

18. The riser of claim 10, said skirt and said side wall being of substantially the same height.

* * * * *